US008517076B2

(12) United States Patent
Matsushita et al.

(10) Patent No.: US 8,517,076 B2
(45) Date of Patent: Aug. 27, 2013

(54) TRANSFER TOOL

(75) Inventors: Kinya Matsushita, Osaka (JP); Hideto Shima, Kyoto (JP)

(73) Assignee: Kokuyo Co., Ltd., Osaki-Shi, Osaka (JP)

( * ) Notice: Subject to any disclaimer, the term of this patent is extended or adjusted under 35 U.S.C. 154(b) by 212 days.

(21) Appl. No.: 12/737,363

(22) PCT Filed: Jun. 30, 2009

(86) PCT No.: PCT/JP2009/061900

§ 371 (c)(1), (2), (4) Date: Jan. 5, 2011

(87) PCT Pub. No.: WO2010/007877

PCT Pub. Date: Jan. 21, 2010

(65) Prior Publication Data

US 2011/0108196 A1 May 12, 2011

(30) Foreign Application Priority Data

Jul. 16, 2008 (JP) ............................... P2008-184537

(51) Int. Cl.

*B32B 37/26* (2006.01)
*B26F 3/02* (2006.01)
*B43L 19/00* (2006.01)

(52) U.S. Cl.

USPC ............. 156/577; 156/523; 156/527; 118/76; 118/200; 118/257; 242/588; 242/588.3; 242/588.6; 242/160.2; 242/160.4; 242/170; 242/171; 206/411

(58) Field of Classification Search

USPC ................. 156/523, 527, 538, 540, 574, 577, 156/579; 118/76, 200, 257; 225/46; 242/160.2, 160.4, 170, 171, 588, 588.2, 242/588.3, 588.6; 206/411

See application file for complete search history.

(56) References Cited

U.S. PATENT DOCUMENTS 5,795,085 A * 8/1998 Yoo ............................... 400/248
5,820,728 A * 10/1998 Stevens et al. ................ 156/577
6,273,169 B1 * 8/2001 Ono et al. ..................... 156/540

(Continued)

FOREIGN PATENT DOCUMENTS

JP 09002724 A * 1/1997
JP 2002-274097 A 9/2002

(Continued)

*Primary Examiner* — Mark A Osele

(74) *Attorney, Agent, or Firm* — McGinn Intellectual Property Law Group, PLLC

(57) ABSTRACT

In a transfer tool A, a support mechanism X for supporting a transfer head 2 on a transfer tool main body 1 so that the transfer head 2 can swing about a rolling axis R includes the transfer head 2 as a first member having a receiving gap 221 (to be described later) provided to the transfer head 2 and orthogonal to the rolling axis R and a moving arm 13 as a second member provided to the transfer tool main body 1 and having an insertion wall 132 to be inserted into the receiving gap 221 to be swingable along and with respect to opposed inner side faces 221*a* and 221*b* of the receiving gap 221. A fulcrum member 222 corresponding to a clearance dimension between the inner side faces 221*a* and 221*b* and for positionally restricting the insertion wall 132 so that the insertion wall 132 can swing about the rolling axis R is provided in the receiving gap 221 in the transfer head 2.

15 Claims, 8 Drawing Sheets

(56) References Cited

U.S. PATENT DOCUMENTS

| | | | | |
|---|---|---|---|---|
| 6,599,363 | B2 * | 7/2003 | Narita | 118/76 |
| 7,334,622 | B2 * | 2/2008 | Stade | 156/577 |
| 7,681,616 | B2 * | 3/2010 | Marschand et al. | 156/577 |
| 2002/0195205 | A1 * | 12/2002 | Watanabe | 156/577 |
| 2003/0034133 | A1 * | 2/2003 | Huthmacher | 156/577 |
| 2004/0250961 | A1 * | 12/2004 | Rolion | 156/577 |

FOREIGN PATENT DOCUMENTS

| | | | |
|---|---|---|---|
| JP | 2003-2522 | A | 1/2003 |
| JP | 2004-148837 | A | 5/2004 |
| JP | 2006-281495 | A | 10/2006 |
| JP | 2006-281496 | A | 10/2006 |
| WO | WO 2008133070 | A1 * | 11/2008 |

* cited by examiner (a)

(b)

TRANSFER TOOL

TECHNICAL FIELD

The present invention relates to a transfer tool capable of transferring transferred material such as adhesive or correcting agent to paper or the like.

BACKGROUND ART

Conventionally, there have been proposed various transfer tools capable of transferring transferred material such as correcting agent or adhesive applied on a tape to a target such as paper.

With each of these transfer tools, it is possible to transfer transferred material from the tape supported on a tip end of a transfer head by holding a transfer tool main body in a hand and pushing the transfer head against the target. Among them, there are proposed, for example, tools each employing a structure in which a head can swing in a predetermined range about an extending direction of the tape and the transfer head as a rolling axis so that the transferred material applied on the tape can be reliably transferred to the target from the entire width of the tape at the tip end of the transfer head (see Patent Document 1 and Patent Document 2, for example).

Patent Document 1 also proposes a tool in which a part of a transfer head mounted to a transfer tool main body and provided along a rolling axis is deformed elastically in a twisted manner and, as a result, a tip end of the transfer head can move in a range of the elastic deformation with respect to the transfer tool main body. With such swinging movement, it is possible to prevent a problem that the transferred material is not transferred in a correct shape due to displacement or a small movement of fingers at the start of transfer or during transfer operation, and specifically a problem that the transferred material is transferred only in a narrower range than a width of the tape.

On the other hand, in the tool described in Patent Document 2, the transfer head is provided with an opening in a direction orthogonal to the rolling axis and a protrusion provided to the transfer tool main body is inserted through the opening. In this way, the protrusion sets a shape of an inner wall of the opening in contact with the protrusion while supporting the transfer head and, as a result, the transfer head can turn about the rolling axis while being supported by the protrusion. This structure also allows for the displacement or a small movement of the fingers described above in the above-described range of rotation.

PRIOR ART DOCUMENTS

Patent Documents

Patent Document 1: Japanese Unexamined Patent Publication No. 2006-281495

Patent Document 2: Japanese Unexamined Patent Publication No. 2003-2522

SUMMARY OF THE INVENTION

Problem to be Solved by the Invention

However, in order to move the transfer head to such a degree as to sufficiently allow for the movement of the fingers by utilizing the elastic deformation as in the tool described in Patent Document 1, it is necessary to increase dimensions of a portion which is fixed to the transfer tool main body and which is to be elastically deformed, and especially a dimension of the portion in the direction of the rolling axis.

On the other hand, with the transfer head which can rotate as described in Patent Document 2 and if the inner wall of the opening is in such a shape that the transfer head moves only about the rolling axis with respect to the protrusion, it is necessary to increase a dimension, along the rolling axis, of the opening formed in the transfer head or to provide a portion, other than the opening, to be supported on the transfer tool main body in order to avoid unnecessary movement of the transfer head especially about the protrusion. For this purpose, it is necessary to increase a dimension in the direction of the rolling axis similarly to that of Patent Document 1 described above.

Focusing on such a problem, the present invention provides a transfer tool which can be compact in spite of its structure for swinging movement.

Means for Solving the Problem

To achieve the above object, the present invention takes the following means. Specifically, a transfer tool according to the invention is characterized by including a transfer tool main body, a transfer head protruding from the transfer tool main body, and a support mechanism for supporting the transfer head on the transfer tool main body so that the transfer head can swing about a rolling axis, wherein the support mechanism includes a first member having a receiving gap provided to one of the transfer head and the transfer tool main body and orthogonal to the rolling axis, and a second member having an insertion wall to be inserted into the receiving gap in the first member so as to swing along and with respect to opposed inner side faces of the receiving gap. A fulcrum member corresponding to a clearance dimension of the gap and for positionally restricting the insertion wall so that the insertion wall can swing about the rolling axis is provided in the receiving gap in the first member.

Here, the “gap” like the receiving gap described above refers to an opening or a notch which is longer in a direction orthogonal to an extending direction of the head than in the extending direction.

With this structure, when the insertion wall is inserted into the receiving gap, it is possible not only to achieve, with the fulcrum member and the insertion wall, movement about the rolling axis but also to effectively prevent movement other than the swinging movement by contact of the inner side faces of the receiving gap and the insertion wall with each other. Therefore, a dimension of the transfer head necessary for the swinging movement is achieved only by the clearance dimension of the receiving gap and, as a result, it is possible to make the transfer head compact especially in the extending direction of the tape. In this way, while maintaining reliability of transfer of the transferred material, it is possible to easily apply to the transfer head moving performance in other directions or to cause the transfer head to retract into the transfer tool main body, for example, for replacing the replacement part.

To achieve the support mechanism of higher strength by means of the fulcrum member, it is preferable that the fulcrum member is integrally provided with the first member and connects the inner side faces of the receiving gap. In order to make the transfer head more compact, it is preferable that the first member serves as the transfer head.

As a concrete structure for achieving smoother swinging movement, the fulcrum member may be provided as a rib-shaped member disposed to be orthogonal to the inner side faces of the receiving gap, a tip end edge of the fulcrum member may be formed in a shape of a half cylinder about the rolling axis, and a recessed portion formed at an insertion edge of the insertion wall may be engaged with the tip end edge so that the recessed portion can swing.

To make the engagement of the transfer tool main body and the transfer head with each other in the support mechanism more reliable, a retaining element for preventing coming off of the insertion wall from the fulcrum member is preferably provided outside the receiving gap.

Moreover, if the second member is further provided with an outer wall rising in parallel to the insertion wall and the retaining element is engaged with the outer wall, the strength is increased. Therefore, it is possible to achieve sufficient strength and stable swinging, even if the clearance dimension of the receiving gap and a thickness of the insertion wall are reduced.

To suitably bear an operating force such as pressing force applied during the transfer, it is preferable to employ the structure in which the insertion wall is inserted into the receiving gap from above so that the engagement of the fulcrum member and the insertion wall with each other becomes stronger when they receive the operating force applied from below during the transfer.

If the structure described above is utilized and the support mechanism is formed by providing the first member or the second member to a moving arm capable of moving between a transfer position which is provided in the transfer tool main body and in which the transfer head can transfer and a housing position in which the transfer head can be housed in the transfer tool main body, it is possible to make a moving range of the transfer head more compact and, as a result, it is possible to suitably provide for replacement of the replacement part when the transfer head is brought into the housing position.

As a structure for more stably transferring the transferred material during the transfer, the transfer head may oscillate in a width direction and about an axis set in a position displaced from a transfer end toward a base end of the transfer head. As a concrete structure for this purpose, the transfer head may include a head main body having, at its tip end, a transfer end for transferring transferred material, and a head mounting portion for supporting the head main body, so that the head main body may oscillate with respect to the head mounting portion.

When the oscillation is employed, in order to achieve a structure in which the transfer end can reliably press a transfer target while effectively preventing the pressing force applied to the transfer head by the oscillation from escaping due to the oscillation, it is preferable that the support mechanism is provided between the transfer main body and the head mounting portion and the transfer end of the head main body is disposed below an imaginary axis extending from the rolling axis.

Effects of the Invention

According to the present invention, the dimension of the transfer head necessary for the swinging movement is achieved only by the clearance dimension of the receiving gap and, as a result, it is possible to make the transfer head compact especially in the extending direction of the tape.

MODE FOR CARRYING OUT THE INVENTION

Figure 1:
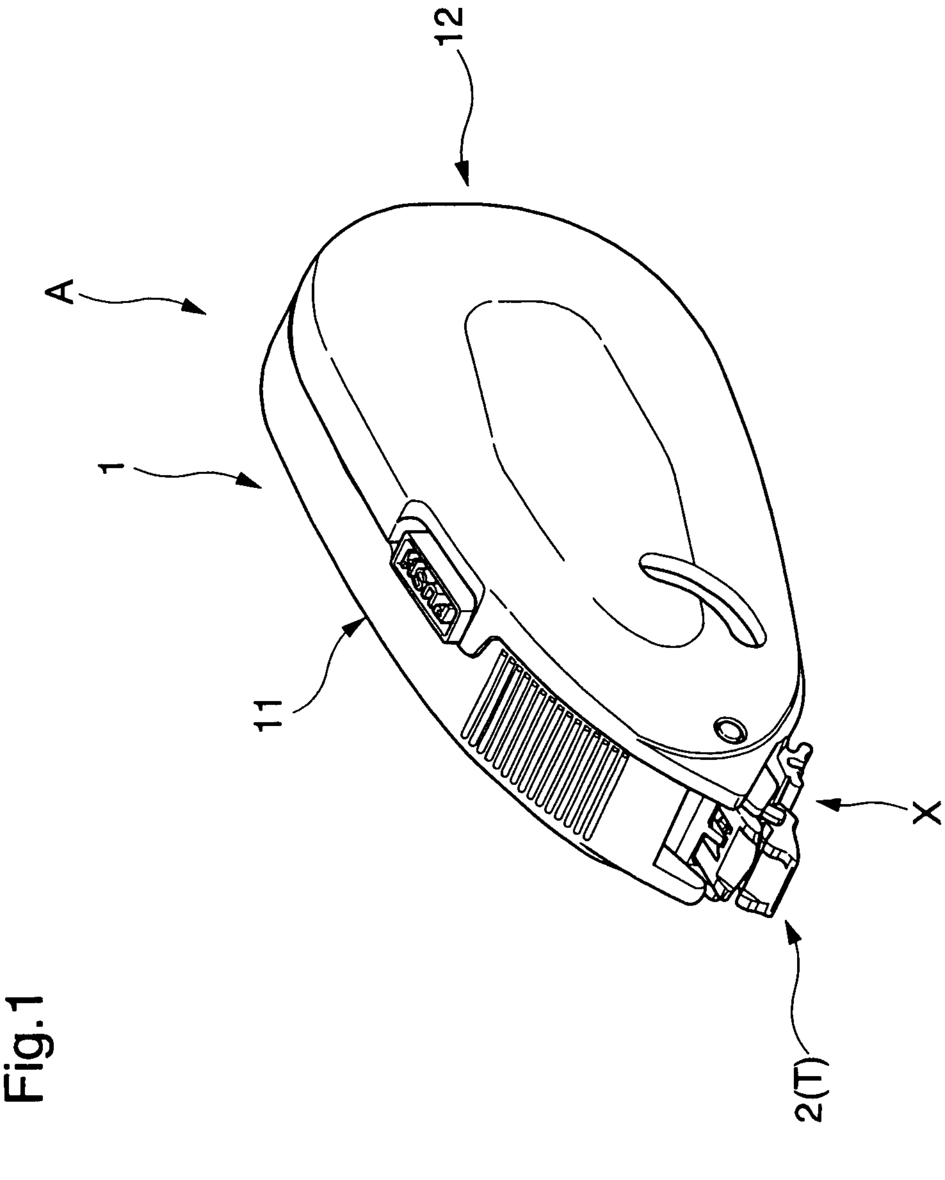
FIG. 1 is an external view of a transfer tool according to an embodiment of the present invention.

An embodiment of the present invention will be described with reference to the drawings. In the present embodiment, a transfer tape wound around and looped over a transfer head 2 and a take-up reel is not illustrated in the drawings.

A transfer tool A according to the present embodiment is a type of tool including a transfer tape formed by applying correcting agent as transferred material on a tape so as to apply the correcting agent onto a transfer target such as paper, mainly includes a transfer tool main body 1 and transfer head 2 as illustrated in FIG. 1, and is what is called a tool of a longitudinal-drawing type used by pressing the transfer head 2 with the transfer tool main body 1 being oriented longitudinally with respect to the transfer target such as paper.

The transfer tool main body 1 mainly has a first case 11 for supporting main mechanism parts including the transfer head 2, a refill 14 which is a replacement part, and a second case 12 engaged with the first case 11.

Figure 2:
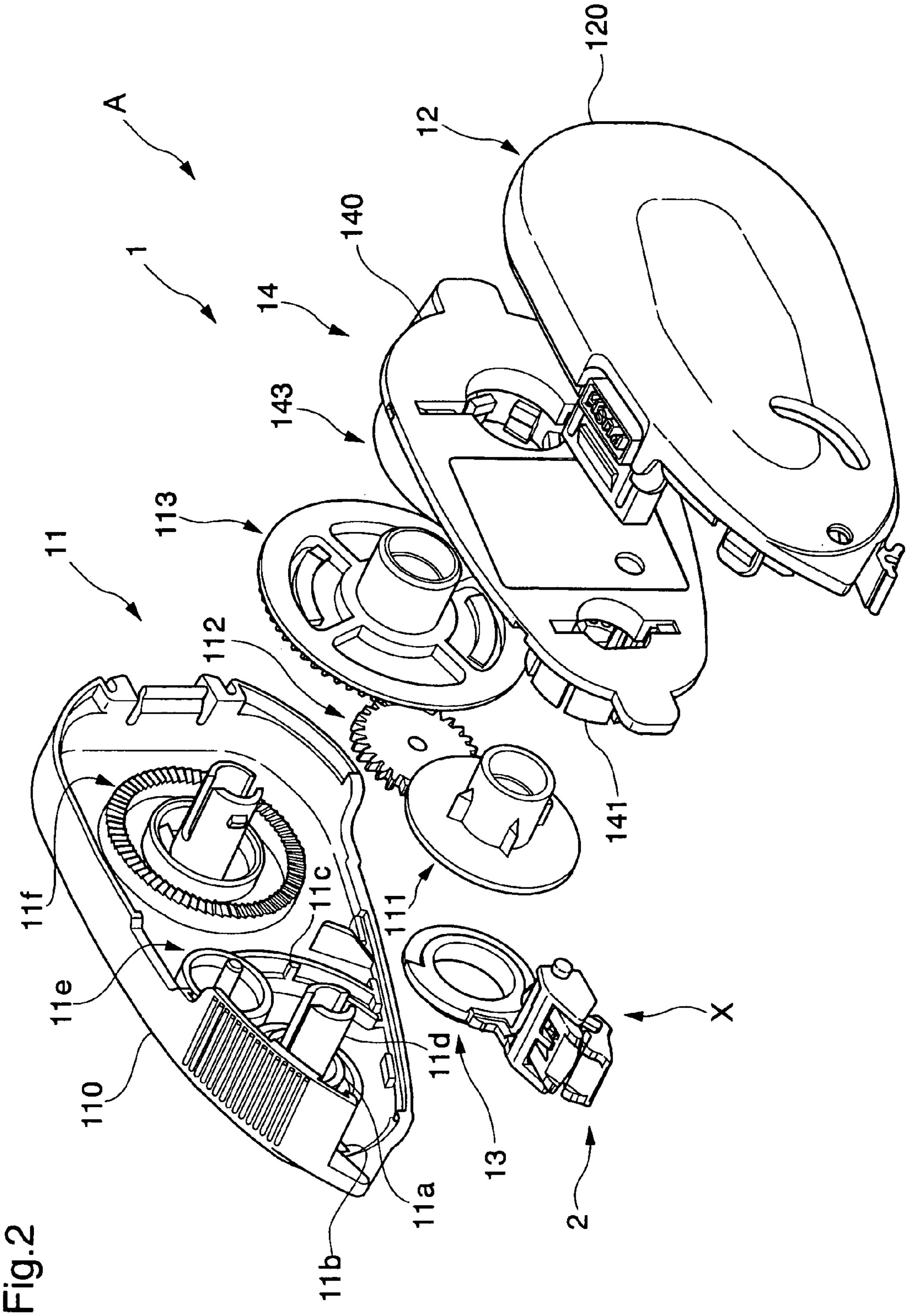
FIG. 2 is an exploded view of the transfer tool.
Figure 3:
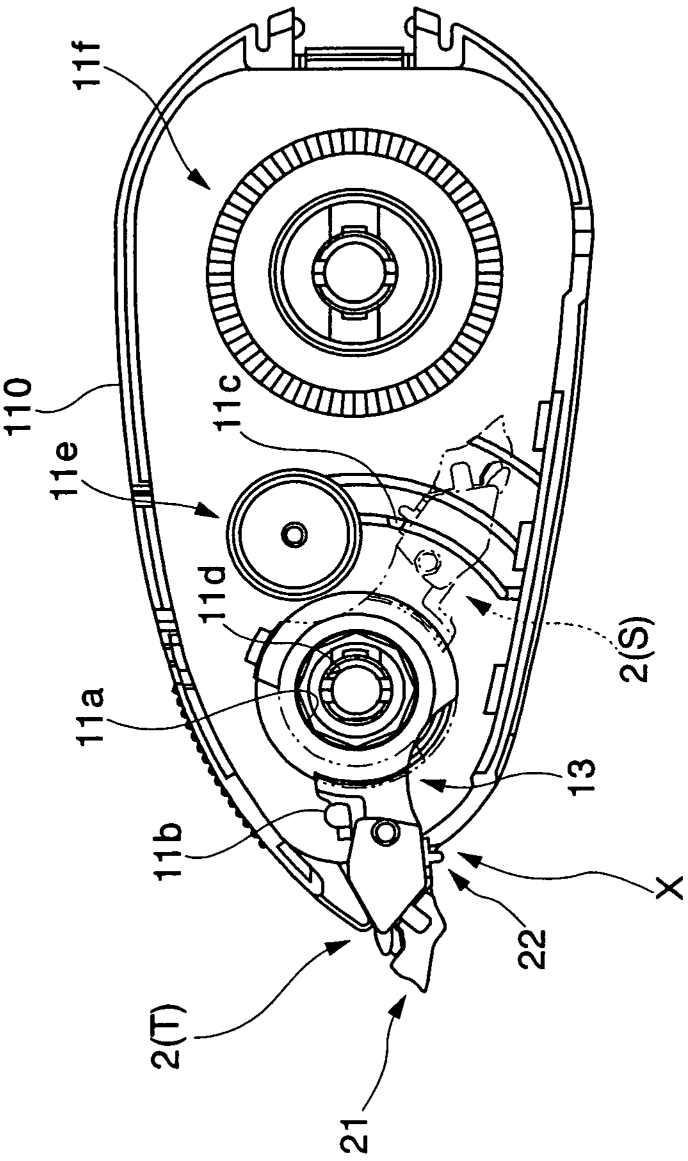
FIG. 3 is a movement explanation view of movement of a transfer head of the transfer tool.

As illustrated in FIGS. 2 and 3, the first case 11 is formed by mounting a take-up reel support portion 111, an interposed gear 112, a delivery reel support portion 113, and a moving arm 13 which will be described later in detail to a first case main body 110 which serves as a main body of the first case 11. The first case main body 110 has a moving arm mounting portion 11*a* for mounting the moving arm 13 on an inner face so that the moving arm 13 can rotate, a transfer position stopper 11*b* to be engaged with the moving arm 13 to thereby position the transfer head 2 in a transfer position (T), a housing position stopper 11*c* for coming in contact with the transfer head 2 to position the transfer head 2 in the housing position (S), a take-up shaft 11*d* formed coaxially with the moving arm mounting portion 11*a* and for supporting the take-up reel support portion 111, an interposed gear mounting shaft 11*e* for supporting the interposed gear 112, and a delivery shaft 11*f* for supporting the delivery reel support portion 113. The take-up reel support portion 111 has a take-up reel (not illustrated) to be engaged with the interposed gear 112 on the side of the first case 11 and supports a take-up reel 141 on the side of the second case 12. The delivery reel support portion 113 forms a delivery gear to be engaged with the interposed gear 112 on the side of the first case 11 and supports a delivery reel 143 on the side of the second case 12. In the present embodiment, the delivery reel support portion 113 and the delivery reel 143 are supported, so that they can rotate with respect to each other when the tape is pulled with a certain or greater force, to thereby form a sliding mechanism. With this sliding mechanism, the tape looped over the delivery reel 143 and then over the take-up reel 141 via the transfer head 2 is constantly held under a tension of optimum strength.

The moving arm 13 forms a second member according to the present invention, which is mounted, at a base end portion 130 thereof and to be turnable, to the moving arm mounting portion 11*a* formed on the first case main body 110 as described above and which supports, at a tip end portion 131 thereof, the transfer head 2 through a support mechanism X to be described later. Specific structures of the moving arm 13 and the support mechanism X as well as the transfer head 2 will be described later in detail.

The refill 14 is the replacement part made up of the take-up reel 141 supported on the take-up reel support portion 111, the delivery reel 143 supported on the delivery reel support portion 113, and a support plate 140 for temporarily retaining them.

The second case 12 is mainly made up of a second case main body 120, is mainly engaged with the first case 11 to form an outer shape of the transfer tool main body 1 together with the first case 11, and is for protecting the refill 14 and inner mechanism parts. Hinges and engaging structures through which the second case main body 120 is engaged with the first case 110 will not be described in detail in the present embodiment.

In the present embodiment, as illustrated in FIG. 3, by rotatably mounting the moving arm 13 in the transfer tool main body 1, the moving arm 13 can turn between the transfer position (T) which is illustrated by a solid line and in which the moving arm 13 is positioned by the transfer position stopper 11*b* and a housing position (S) which is illustrated by a broken line and in which the moving arm 13 is positioned by the housing position stopper 11*c*. In the transfer tool A according to the present embodiment, the transfer head 2 is positioned in a space between the delivery reel 143 and the take-up reel 141 in this housing position (S). To replace the refill 14, the first case 11 and the second case 12 are firstly disengaged from each other, then the transfer head 2 is brought into the housing position (S), and the refill 14 is replaced. Then, the transfer head 2 is brought into the transfer position (T) again and the second case 12 is engaged with the first case 11 again. In this way, it is possible to easily replace the refill 14. Although the refill 14 is housed together with the support plate 140 in both the cases 11 and 12 in the present embodiment, the support plate 140 may be detached and only the delivery reel 143 and the take-up reel 141 may be housed in both the cases 11 and 12 after the refill 14 is attached.

Here, the transfer tool A according to the present embodiment has the support mechanism X for supporting the transfer head 2 on the transfer tool main body 1 so that the transfer head 2 can swing about a rolling axis R as illustrated in FIGS. 4 to 8. More specifically, the support mechanism X includes the transfer head 2 as the first member having a receiving gap 221 to be described later, provided to the transfer head 2 orthogonally to the rolling axis R, and the moving arm 13 as the second member provided to the transfer tool main body 1 and having an insertion wall 132 which is inserted into the receiving gap 221 and can swing along and with respect to opposed inner side faces 221*a* and 221*b* of the receiving gap 221. In the receiving gap 221 in the transfer head 2, there is provided a fulcrum member 222 corresponding to a clearance dimension between the inner side faces 221*a* and 221*b* for positionally restricting the insertion wall 132 so that the insertion wall 132 can swing about the rolling axis R.

Figure 4:
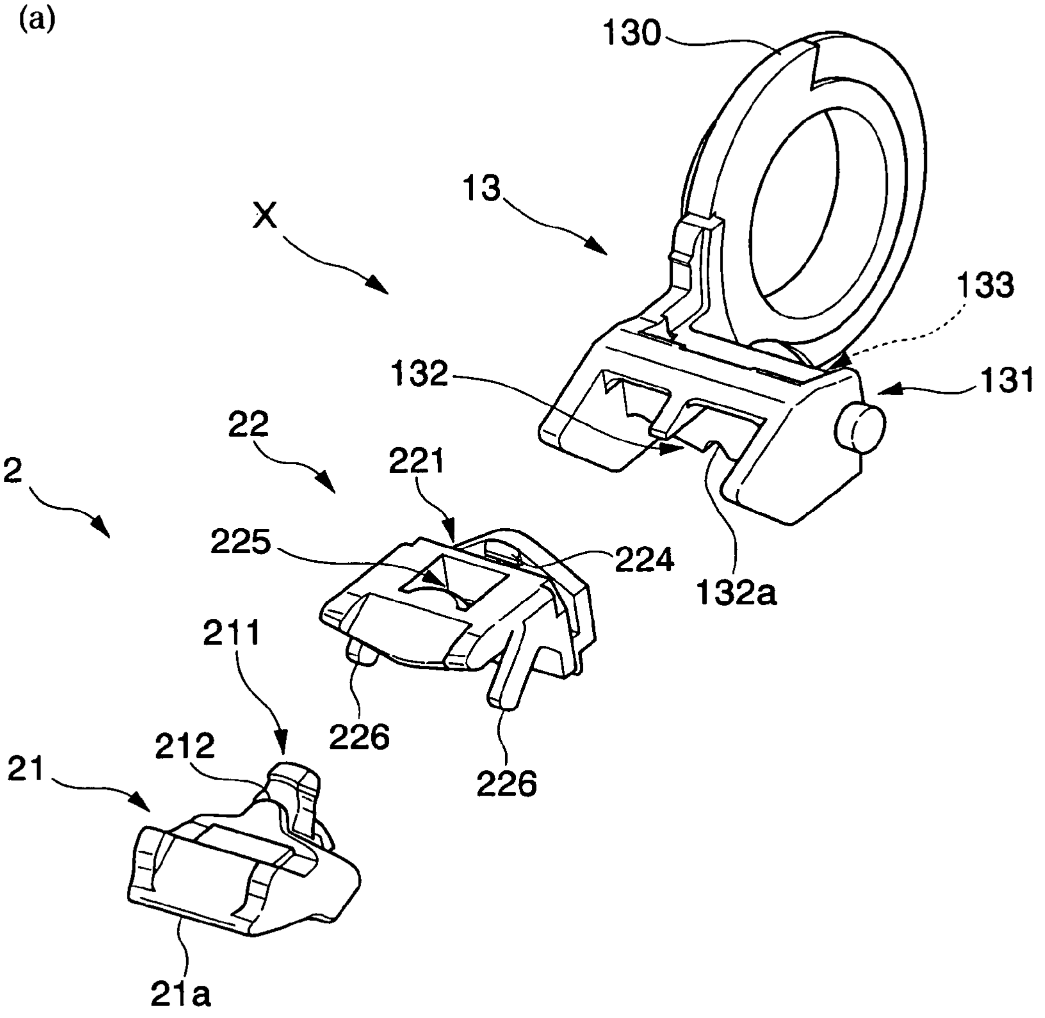
FIGS. 4(*a*) and 4(*b*) are structure explanation views of an essential portion of the transfer tool.
Figure 4:
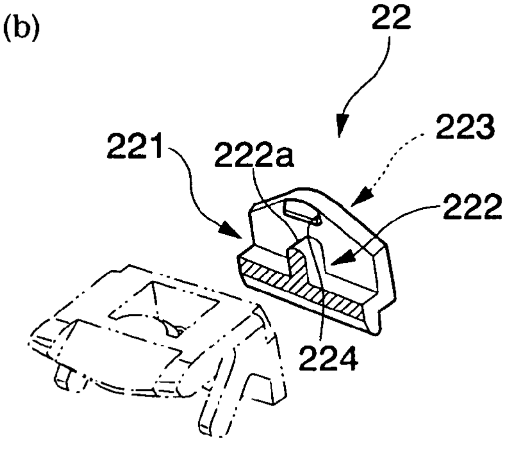

Structures and movements of the transfer head 2 and the moving arm 13 forming the support mechanism X will be described with reference to FIGS. 4(*a*) to 8(*b*). Here, FIG. 4(*b*) is a partially cutaway view of a head mounting portion 22. FIGS. 6(*a*) and 6(*b*) are sectional views taken along a line I-I and a line II-II in FIG. 5, and FIGS. 7(*a*) to 8(*b*) are movement explanation views corresponding to FIGS. 6(*a*) and 6(*b*).

As described above, the moving arm 13 includes the base end portion 130 rotatably mounted to the first case 11 and the tip end portion 131 for supporting the transfer head 2.

The tip end portion 131 includes the insertion wall 132 which can be inserted from above into the receiving gap 221 and an outer wall 133 which stands in parallel to the insertion wall 132. The insertion wall 132 is formed so that its thickness substantially corresponds to the dimension between the inner side faces 221*a* and 221*b* (to be described later) of the receiving gap 221 and has a contact face 132*c* which is curved from opposite sides and protruding downward while being curved and comes in contact with an inner bottom face 221*c* (to be described later) and swings, and a recessed portion 132*a* which is formed by recessing, in an upward direction on an insertion end at a center of the contact face 132*c*. The insertion wall 132 has a second engaged face 132*b* to be engaged with a second retaining element 224 inside the receiving gap 221. The outer wall 133 rises in parallel to the insertion wall 132 from the base end side so as to be engaged with the head mounting portion 22 and has an engaged face 133*a* which is a curved face to be engaged with a retaining element 223 on an outside of the receiving gap 221 and a swinging space 134 for allowing for swinging movement of the retaining element 223 during the swinging movement of the transfer head 2 as illustrated in FIGS. 6(*a*) to 8(*b*).

The transfer head 2 includes a head main body 21 having, at its tip end, a transfer end 21*a* for transferring transferred material, and the head mounting portion 22 supported on the moving arm 13 so as to be swingable about the rolling axis R and for supporting the head main body 21 so that the head main body 21 can oscillate.

The head mounting portion 22 has the receiving gap 221 formed in a direction orthogonal to the rolling axis R, the fulcrum member 222 rising from the inner bottom face 221*c* so as to connect the inner side faces 221*a* and 221*b* of the receiving gap 221, a retaining element 223 for prohibiting coming out of the insertion wall 132 on the outside of the receiving gap 221, the second retaining element 224 for prohibiting coming out of the insertion wall 132 on the inside of the receiving gap 221, an inserting hole 225 through which the head main body 21 is inserted, a pair of elastic biasing portions 226 for elastically biasing the head main body 21 oscillating in a width direction, and an oscillation face 227 for coming in contact with the head main body 21 to guide the oscillation. The fulcrum member 222 is a rib-shaped portion formed integrally with and continuously from the inner side faces 221*a* and 221*b* at the center of the lower end of the receiving gap 221. By forming a tip end edge 222*a* of the fulcrum member 222 into a shape of a half cylinder, the fulcrum member 222 is swingably engaged with the recessed portion 132*a* formed at the insertion edge of the insertion wall 132. The retaining element 223 and the second retaining element 224 have a retaining face 223*a* and a second retaining face 224*a* to be respectively engaged with the engaged face 133*a* and the second engaged face 132*b* provided to the moving arm 13.

The head main body 21 has an inserted portion 211 which is a portion to be inserted into the inserting hole 225 in the head mounting portion 22 and a contact face 212 for coming in contact with the oscillation face 227 and swinging when the inserted portion 211 is inserted. When the contact face 212 swings along the oscillation face 227, the head main body 21 can oscillate about an oscillation axis Y which is a yawing axis illustrated in FIG. 5.

Figure 5:
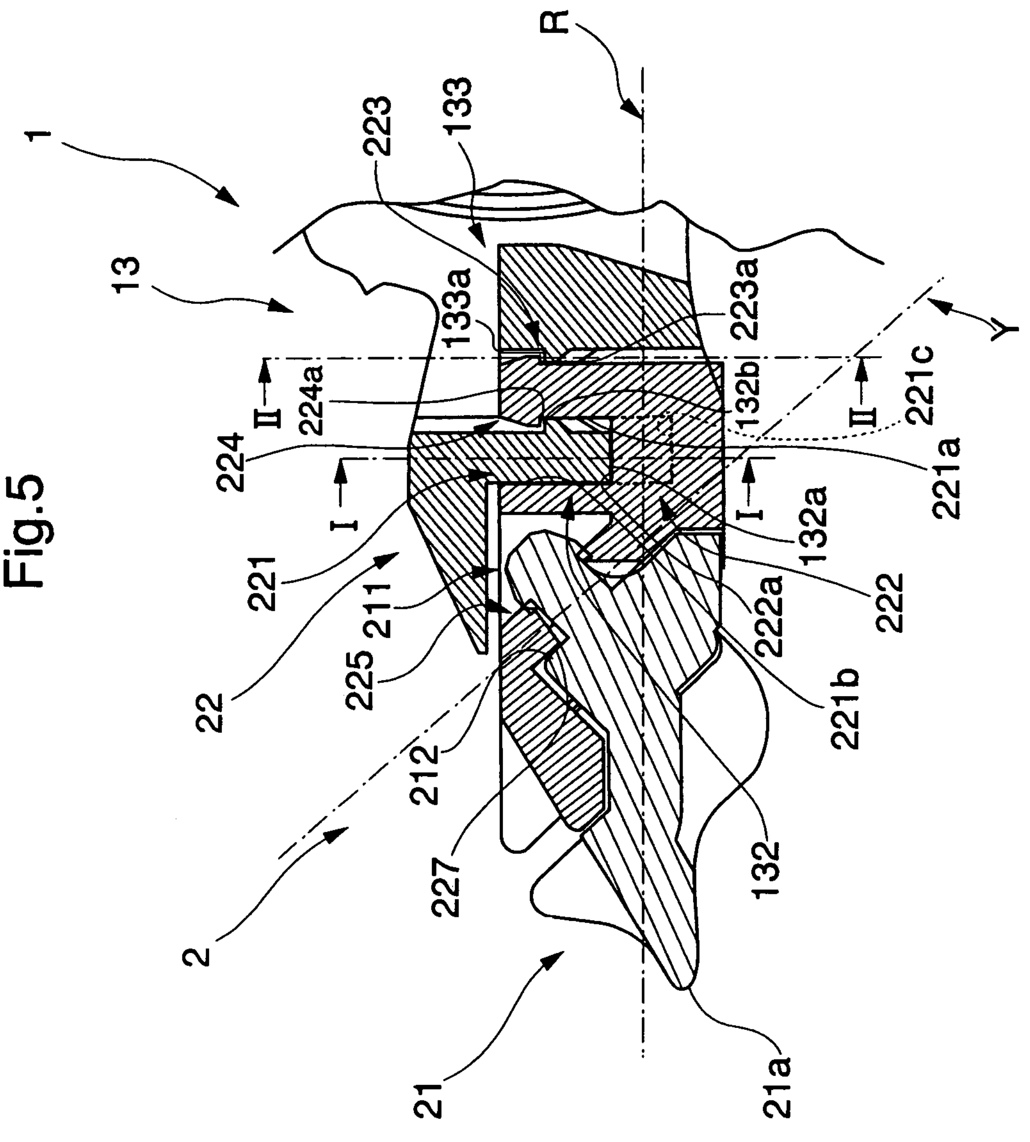
FIG. 5 is a sectional view of a center of the essential portion.
Figure 6:
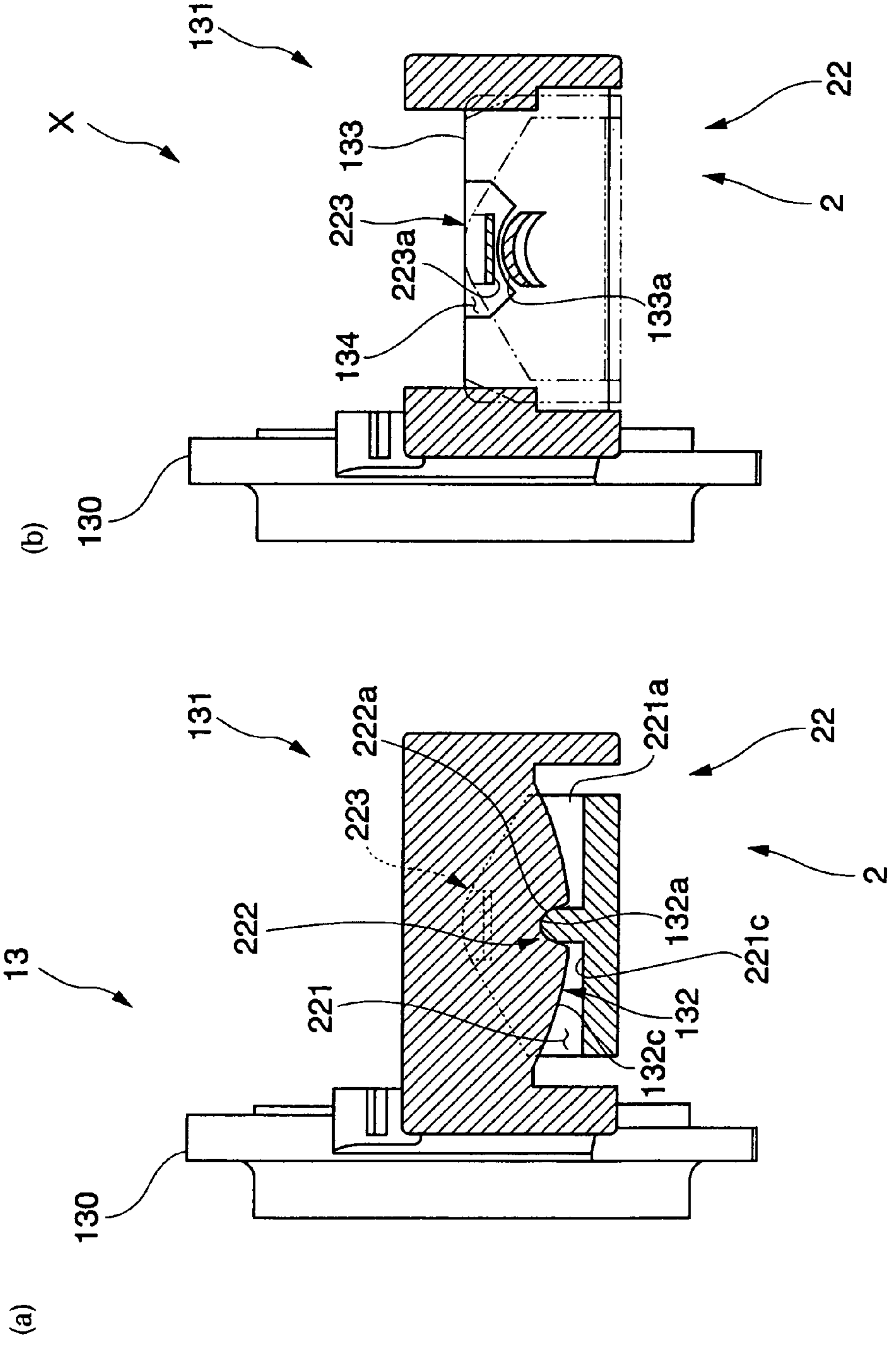
FIGS. 6(*a*) and 6(*b*) are sectional views taken along a line I-I and a line II-II in FIG. 5.

In the present embodiment, as illustrated in FIG. 5, the center of the oscillation of the head main body 21 is in a position displaced from the transfer end 21*a* of the transfer head 2 toward the base end. Moreover, the center of the oscillation of the head main body 21 is closer to the tip end of the transfer head 2 than a center position of the swinging movement by the support mechanism X. Furthermore, in the present embodiment, the transfer end 21*a* of the head main body 21 is disposed on a lower side of the rolling axis R and, more specifically, an imaginary axis extending from the rolling axis R as illustrated in FIG. 5.

Figure 7:
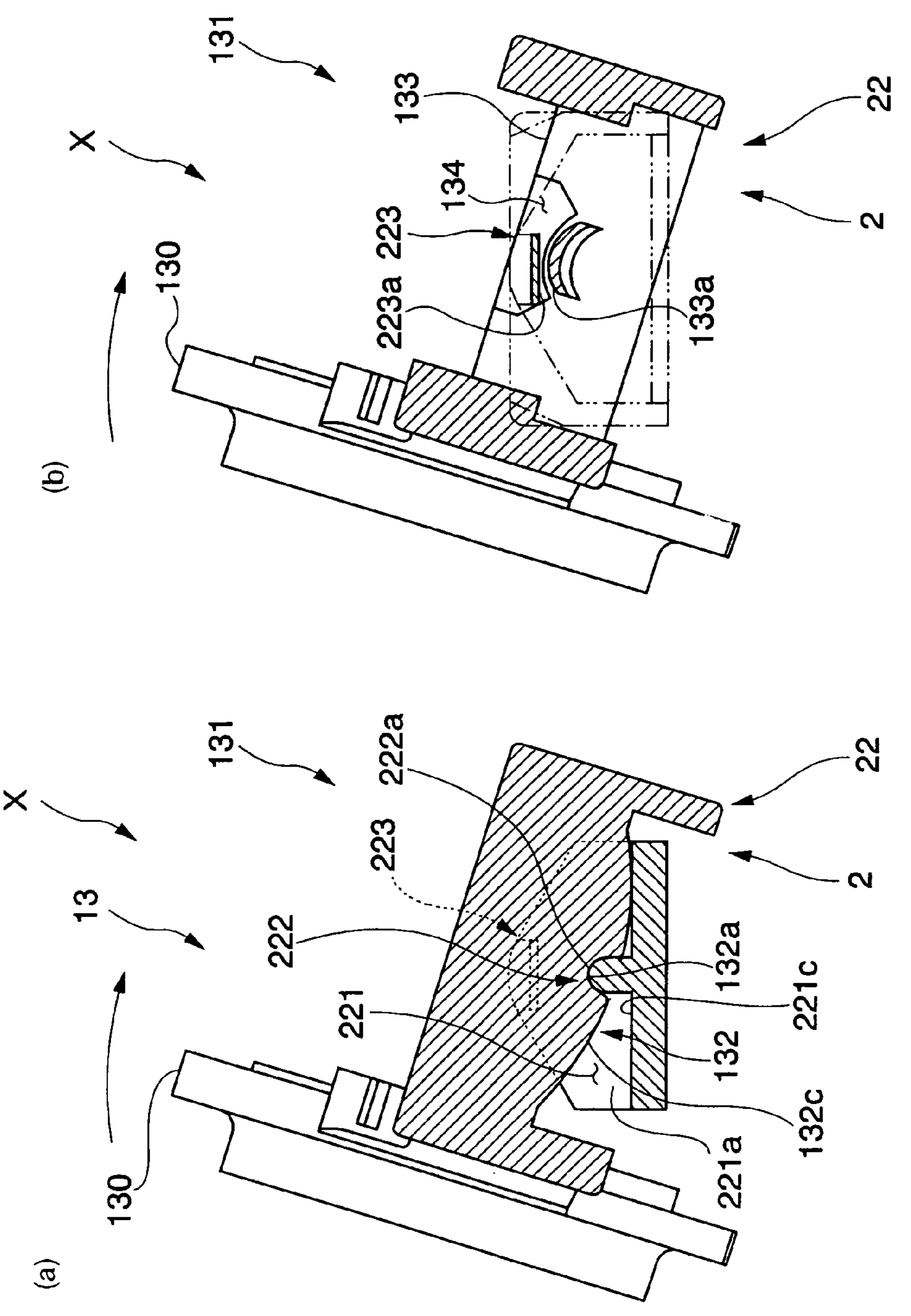
FIGS. 7(*a*) and 7(*b*) are movement explanation views according to FIGS. 6(*a*) and 6(*b*).
Figure 8:
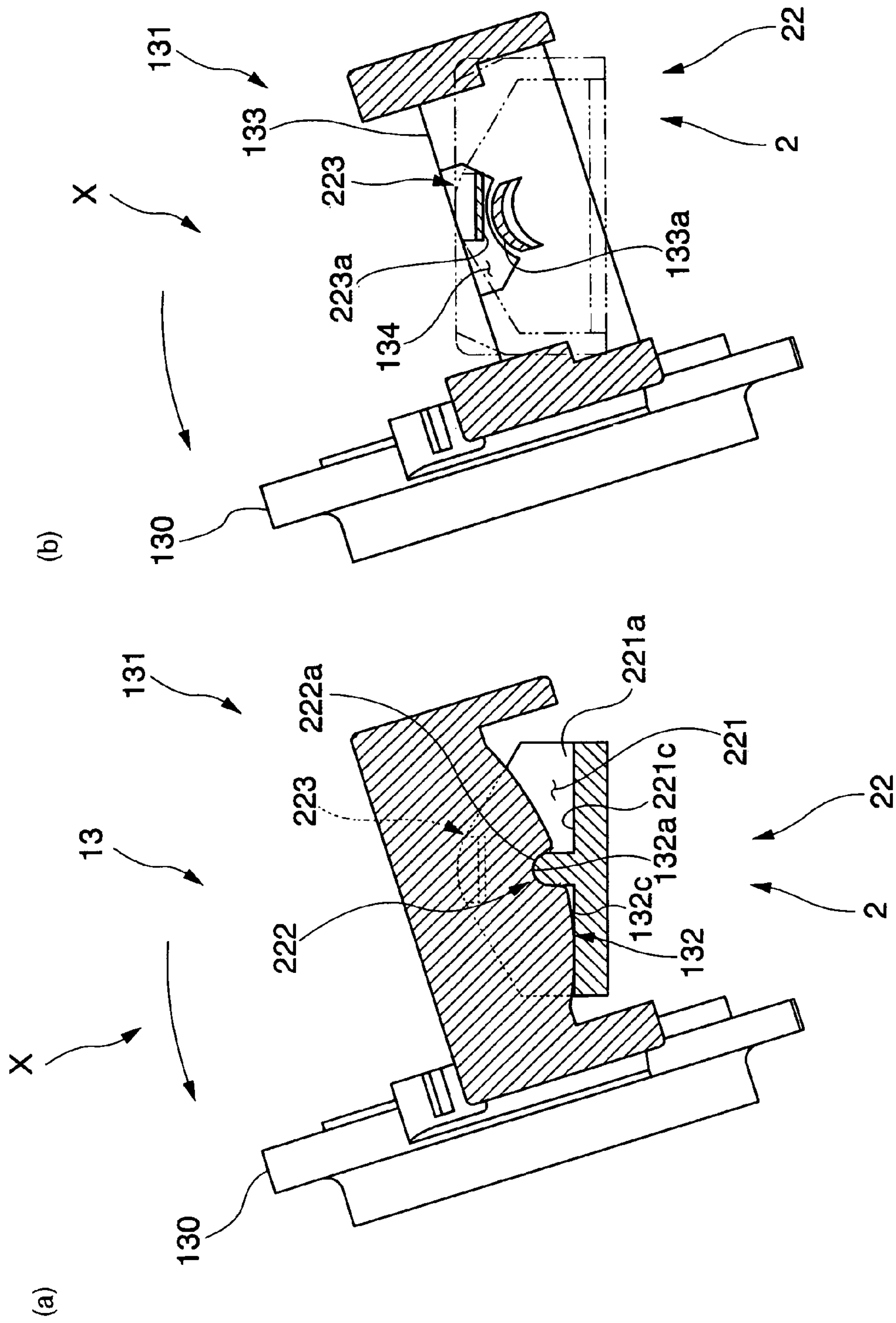
FIGS. 8(*a*) and 8(*b*) are movement explanation views according to FIGS. 6(*a*) and 6(*b*).

As a result, in the present embodiment, by providing the support mechanism X, the swinging movement as illustrated in FIGS. 7(*a*), 7(*b*), 8(*a*), and 8(*b*) from the state illustrated in FIGS. 6(*a*) and 6(*b*) can be realized. More specifically, as illustrated in these figures, the recessed portion 132*a* of the insertion wall 132 inserted into the receiving gap 221 from above rotates along a surface of the tip end edge 222*a* of the fulcrum member 222 and the contact face 132*c* of the insertion wall 132 and the inner bottom face 221*c* of the receiving gap 221 slide with respect to each other to thereby achieve the stable swinging movement about the rolling axis R. At this time, the retaining element 223 swings in the swing space 134 and therefore, the retaining face 223*a* does not interfere with the engaged face 133*a* of the moving arm 13, which enables the smooth swinging movement as a result of sliding of the tip end edge 222*a* and the recessed portion 132*a* against each other. Although it is not illustrated in the drawings, the second retaining element 224 similarly contributes to the smooth swinging movement without interference of the second retaining face 224*a* with the second engaged face 132*b*.

With the above structure, in the transfer tool A according to the present embodiment, when the insertion wall 132 is inserted into the receiving gap 221, it is possible not only to achieve, with the fulcrum member 222 and the insertion wall 132, the movement about the rolling axis R but also to effectively prevent movement other than the swinging movement by the contact of the inner side faces 221*a* and 221*b* of the receiving gap 221 and the insertion wall 132 with each other. Therefore, the dimension of the transfer head 2 necessary for the swinging movement is achieved only by the dimension of the receiving gap 221 and, as a result, it is possible to make the transfer head 2 compact especially in the extending direction of the tape. In this way, while maintaining reliability of the transfer of the transferred material, it is possible to apply moving performance in other directions to the transfer head 2 or to cause the transfer head 2 to recede into the transfer tool main body 1, for example, for replacement of the replacement part.

In order to achieve the support mechanism X of higher strength in the present embodiment, the fulcrum member 222 is integrally provided with the first member and connects the inner side faces 221*a* and 221*b* of the receiving gap 221. In order to form the transfer head 2, to which an external force is applied directly, into a compact but high-strength structure, the first member employing the structure of connecting the inner side faces 221*a* and 221*b* of the receiving gap 221 to each other is used as the transfer head 2.

With the structure in which the fulcrum member 222 is the rib-shaped member disposed to be orthogonal to the inner side faces 221*a* and 221*b* of the gap, the tip end edge 222*a* of the fulcrum member 222 is formed in the shape of the half cylinder about the rolling axis R, and the recessed portion 132*a* formed at the insertion edge of the insertion wall 132 is engaged with the tip end edge 222*a* so that the recessed portion 132*a* can swing, the smooth swinging movement is achieved.

In order to make the engagement of the transfer tool main body 1 and the transfer head 2 with each other in the support mechanism X more reliable, the retaining element 223 for preventing coming off of insertion wall 132 from the fulcrum member 222 is provided outside the receiving gap 221.

Furthermore, by further providing the outer wall 133 rising in parallel to the insertion wall 132, the structure in which the retaining element 223 is engaged with the outer wall 133 is achieved to further increase the strength.

In order to suitably bear an operating force during the transfer, the present embodiment employs the structure in which the insertion wall 132 is inserted into the receiving gap 221 from above so that the engagement of the fulcrum member 222 and the insertion wall 132 with each other becomes stronger when they receive the operating force applied from below during the transfer.

By utilizing the structure described above and forming the support mechanism X by supporting the transfer head 2 according to the present embodiment on the moving arm 13 capable of moving between the transfer position (T) which is provided in the transfer tool main body 1 and in which the transfer head 2 can transfer and the housing position (S) in which the transfer head 2 can be housed in the transfer tool main body 1, the transfer tool A in which a moving range of the transfer head 2 is made more compact is achieved. As a result, it is possible to smoothly carry out replacement of the replacement part when the transfer head 2 is brought into the housing position (S).

In order to more effectively absorb a shake of movement of fingers during the transfer to stably carry out the transfer, the transfer tool according to the present embodiment is formed so that the transfer head 2 can oscillate in the width direction and about the axis set in the position displaced from the transfer end 21*a* toward the base end of the transfer head. In other words, the transfer head 2 includes the head main body 21 and the head mounting portion 22 and the head main body 21 can oscillate with respect to the head mounting portion 22.

Especially in the present embodiment, by effectively preventing the pressing force applied to the transfer head 2 during the transfer from escaping due to the oscillation by disposing the transfer end 21*a* of the head main body 21 below the imaginary axis extending from the rolling axis R, the transfer end 21*a* can reliably press the transfer target.

Although the embodiment of the invention has been described above, the concrete structures of the respective portions are not limited to the embodiment described above and various modifications can be made without departing from the gist of the present invention.

For example, though the present invention is applied to the transfer tool of the longitudinal-drawing type in the above embodiment, the present invention may be applied to what is called a transfer tool of a lateral-drawing type in which the tape is twisted 90° from the take-up shaft and a main body of which is laterally laid down to transfer. Although the transfer tool for transferring the correcting agent has been described in the above embodiment, it is of course possible to apply the present invention to a transfer tool for transferring adhesive. Moreover, it is of course possible to apply the present invention to a transfer tool which does not oscillate and a single-use disposable transfer tool which is not refillable.

In the structure of the embodiment described above, structures of the first member and the second member may be reversed, i.e., the receiving gap may be provided to the transfer tool main body. Especially, as the smooth movement between the first member and the second member about the rolling axis is achieved by forming the tip end edge of the fulcrum member into the curved face and suitably engaging the opposite ends of the recessed portion formed into the curved faces as illustrated in the drawings with the tip end edge in the embodiment described above, necessary movement about the rolling axis may be achieved by suitably setting the shapes of the insertion wall and the recessed portion to come in contact with the fulcrum member.

Other concrete structures of the respective portions are not limited to those in the above embodiment and various modifications may be made without departing from the gist of the present invention.

Industrial Applicability

By utilizing the present invention, the dimension of the transfer head necessary for the swinging movement is achieved only by the clearance dimension of the receiving gap and, as a result, it is possible to provide the transfer tool in which the transfer head is made compact especially in the extending direction of the tape.

Description Of Symbols

A . . . transfer tool
1 . . . transfer tool main body
132 . . . insertion wall
132*a* . . . recessed portion
13 . . . second member, moving arm (moving arm)
133 . . . outer wall
14 . . . replacement part (refill)
2 . . . transfer head
22 . . . first member (head mounting portion)
221 . . . receiving gap
221*a*, 221*b* . . . inner side face
222 . . . fulcrum member
222*a* . . . tip end edge
223 . . . retaining element
R . . . rolling axis
T . . . transfer position
S . . . housing position
X . . . support mechanism

The invention claimed is:

1. A transfer tool comprising:

a transfer tool main body, a transfer head protruding from the transfer tool main body, and a support mechanism for supporting the transfer head on the transfer tool main body so that the transfer head is swingable about a rolling axis, wherein the support mechanism includes a first member having a receiving gap provided at one of the transfer head and the transfer tool main body and orthogonal to the rolling axis and a second member having an insertion wall to be inserted into the receiving gap in the first member to be swingable along and with respect to opposed inner side faces of the receiving gap, and a fulcrum member, having a dimension corresponding to a clearance dimension of the gap and for positionally restricting the insertion wall so that the insertion wall is swingable about the rolling axis, is provided in the receiving gap in the first member, wherein the fulcrum member comprises a rib-shaped member disposed to be orthogonal to the inner side faces of the receiving gap, a tip end edge of the fulcrum member is formed in a shape of a half cylinder about the rolling axis, and a recessed portion formed at an insertion edge of the insertion wall is engaged with the tip end edge so that the recessed portion is swingable.

2. The transfer tool according to claim 1, wherein the fulcrum member is integrally provided with the first member and connects the inner side faces of the receiving gap.

3. The transfer tool according to claim 2, wherein the insertion wall is inserted into the receiving gap from a direction orthogonal to the receiving gap.

4. The transfer tool according to claim 2, wherein the transfer head is capable of oscillating in a width direction and about an axis set in a position displaced from a transfer end toward a base end of the transfer head.

5. The transfer tool according to claim 1, wherein the transfer head comprises the first member.

6. The transfer tool according to claim 5, wherein the fulcrum member comprises a rib-shaped member disposed to be orthogonal to the inner side faces of the receiving gap, a tip end edge of the fulcrum member is formed in a shape of a half cylinder about the rolling axis, and a recessed portion formed at an insertion edge of the insertion wall is engaged with the tip end edge so that the recessed portion is swingable.

7. The transfer tool according to claim 5, wherein a retaining element for preventing the insertion wall from coming off the fulcrum member is provided outside the receiving gap.

8. The transfer tool according to claim 1, wherein a retaining element for preventing the insertion wall from coming off the fulcrum member is provided outside the receiving gap.

9. The transfer tool according to claim 1, wherein the insertion wall is inserted into the receiving gap from a direction orthogonal to the receiving gap.

10. The transfer tool according to claim 1, wherein the transfer head is capable of oscillating in a width direction and about an axis set in a position displaced from a transfer end toward a base end of the transfer head.

11. The transfer tool according to claim 10, wherein the transfer head includes a head main body having, at a tip end thereof, a transfer end for transferring transferred material and a head mounting portion for supporting the head main body, and the head main body is capable of oscillating with respect to the head mounting portion.

12. A transfer tool comprising:

a transfer tool main body, a transfer head protruding from the transfer tool main body, and a support mechanism for supporting the transfer head on the transfer tool main body so that the transfer head is swingable about a rolling axis, wherein the support mechanism includes a first member having a receiving gap provided at one of the transfer head and the transfer tool main body and orthogonal to the rolling axis and a second member having an insertion wall to be inserted into the receiving gap in the first member to be swingable along and with respect to opposed inner side faces of the receiving gap, and a fulcrum member, having a dimension corresponding to a clearance dimension of the gap and for positionally restricting the insertion wall so that the insertion wall is swingable about the rolling axis, is provided in the receiving gap in the first member, wherein a retaining element for preventing the insertion wall from coming off the fulcrum member is provided outside the receiving gap, wherein the second member is further provided with an outer wall rising in parallel to the insertion wall and the retaining element is engaged with the outer wall.

13. The transfer tool according to claim 12, wherein the fulcrum member comprises a rib-shaped member disposed to be orthogonal to the inner side faces of the receiving gap, a tip end edge of the fulcrum member is formed in a shape of a half cylinder about the rolling axis, and a recessed portion formed at an insertion edge of the insertion wall is engaged with the tip end edge so that the recessed portion is swingable.

14. The transfer tool according to claim 12, wherein a retaining element for preventing the insertion wall from coming off the fulcrum member is provided outside the receiving gap.

15. A transfer tool comprising:

a transfer tool main body, a transfer head protruding from the transfer tool main body, and a support mechanism for supporting the transfer head on the transfer tool main body so that the transfer head is swingable about a rolling axis, wherein the support mechanism includes a first member having a receiving gap provided at one of the transfer head and the transfer tool main body and orthogonal to the rolling axis and a second member having an insertion wall to be inserted into the receiving gap in the first member to be swingable along and with respect to opposed inner side faces of the receiving gap, and a fulcrum member having a dimension corresponding to a clearance dimension of the gap and for positionally restricting the insertion wall so that the insertion wall is swingable about the rolling axis, is provided in the receiving gap in the first member, wherein the fulcrum member is integrally provided with the first member and connects the inner side faces of the receiving gap, wherein the transfer head comprises the first member.

* * * * *